(12) United States Patent
Chen

(10) Patent No.: US 7,175,330 B1
(45) Date of Patent: Feb. 13, 2007

(54) LIGHT MIXING BACKLIGHT MODULE

(75) Inventor: Wei Hsuan Chen, Kaohsiung (TW)

(73) Assignee: Radiant Opto-Electronics Corporation, Kaohsiung (TW)

(*) Notice: Subject to any disclaimer, the term of this patent is extended or adjusted under 35 U.S.C. 154(b) by 0 days.

(21) Appl. No.: 11/292,009

(22) Filed: Dec. 2, 2005

(51) Int. Cl.
F21V 33/00 (2006.01)

(52) U.S. Cl. .................. 362/613; 362/612; 362/632

(58) Field of Classification Search .......... 362/613, 362/632, 633, 634, 31, 612
See application file for complete search history.

(56) References Cited

U.S. PATENT DOCUMENTS 6,979,102 B2 * 12/2005 You .................. 362/218
2002/0149943 A1 * 10/2002 Obata ................ 362/339

* cited by examiner

Primary Examiner—Laura K. Tso
(74) Attorney, Agent, or Firm—Leong C. Lei

(57) ABSTRACT

A backlight module is provided herein, which mainly contains a casing, a light mixing plate, a diffusion plate, a number of LEDs and optical sheets. The LEDs are positioned along the light incidence planes at the sides of the light mixing plate. The casing is positioned in front of the light mixing plate with the diffusion plate at the back opening of the light mixing plate. The optical sheets are placed in turn behind the diffusion plate. As such, the thickness of the backlight module is reduced significantly.

14 Claims, 12 Drawing Sheets

LIGHT MIXING BACKLIGHT MODULE

BACKGROUND OF THE INVENTION (a) Technical Field of the Invention

The present invention generally relates to backlight modules for liquid crystal display devices, and more particularly to a backlight module using LEDs to emit light into a light mixing plate from the sides.

(b) Description of the Prior Art

Liquid crystal display (LCD) devices were applied mainly in notebook computers and LCD monitors, whose requirement for the backlight modules is focused on light weight, small form factor, and thin thickness. On the other hand, for large-size LCD devices such as LCD TVs, their backlight modules are further required to provide high luminance (at least 450 cd/m$^2$), a wide viewing angle, crispy contrast, and long operational life. As such, direct-lit backlight modules have become the mainstream technology for large-size LCD devices, as they are able to provide planar light having the required high luminance, high uniformity, and a wide viewing angle.

A conventional direct-lit backlight module 1, as, shown in FIG. 1, contains at least a casing 11, multiple lamps 12, a diffusion plate 13, and a number of optical sheets 14. For ease of reference throughout this specification, the terms 'front' and 'back' are used to refer to locations along the path of light that are closer to and farther away from the light source (i.e., lamps) respectively.

The casing 11 is a tray having an opening 111. The opening 111 gradually shrink to the inside of the casing 11. The inner surface of the casing 11 is reflective or is coated with a reflection film 112.

The lamps 12 are usually cold cathode fluorescent lamp (CCFL) tubes arranged in parallel inside the casing 11.

The diffusion plate 13 is a flat object embedded with diffusion agents or diffusion beads, so as to scatter and uniform the light emitted from the lamps 12. The diffusion plate 13 is positioned along the path of light from the lamps 12 and covers the opening 111 of the casing 11.

The optical sheets 14 include one or more diffusion sheets 141 and prism sheets 142, whose functions are for further scattering the light to achieve better uniformity and for focusing the light into a proper viewing angle to achieve enhanced brightness.

To assemble the conventional direct-lit backlight module 1, the lamps 12 are first positioned inside the casing 11. The diffusion plate 13 is then positioned at the opening 111 of the casing 11. At last, the diffusion sheets 141 and the prism sheets 142 are stacked behind the diffusion plate 13 along the path of light. The assembled direct-lit backlight module 1 is illustrated in FIG. 2.

When the direct-lit backlight module 1 is in operation, the lamps 12 radiate light as proper electrical voltage is applied. A portion of the light directly propagates toward the diffusion plate 13. The other portion of the light is reflected by the inner surface of the casing 11 and redirected to the diffusion plate 13. As the light passing through the diffusion plate 13, it is scattered and thereby uniformed by the embedded diffusion agents or diffusion beads. As the light continues to propagate through the diffusion sheets 141 and the prism sheets 142, it is further scattered for uniformity enhancement and then focused into collimated light beams within a proper viewing angle with enhanced brightness.

The foregoing direct-lit backlight module 1 has been proven to be an effective solution and has been put into use in real products. However, the mercury contained in the CCFL tubes presents an environmental hazard during fabrication and recycling as well. Many countries have already been making laws to outlaw the use of mercury in products and goods. As such, CCFL-based direct-lit backlight modules are gradually replaced by direct-lit backlight modules using light emitting diodes (LEDs) as the light source.

As illustrated in FIG. 3, a LED-based direct-lit backlight module 2 mainly contains a casing 21, a number of LEDs 22 as the light source, a light mixing plate 23, a diffusion plate 24, and one or more optical sheets 25.

The casing 21 is a tray having an opening 211. The opening 211 gradually shrink to the inside of the casing 21. The inner surface of the casing 21 is reflective or is coated with a reflection film 212.

The LEDs 22 contain red-light (R) LEDs 221, green-light (G) LEDs 222, and blue-light (13) LEDs 223, and these LEDs are sequentially arranged in lines inside the casing 21.

The light mixing plate 23 is positioned along the path of lights from the LEDs 22 and covers the opening 211 of the casing 21. The light mixing plate 23 is made of a material having high transparency (such as PMMA). The light mixing plate 23 has a light emission plane 231 and a light incidence plane 232. Upon one of the light emission and incidence planes 231 and 232, a number of light shielding dots 233 are coated at locations corresponding to the LEDs 22. The light shielding dots 233 are made of a coating material that can significantly shield the light of the LEDs 22 from penetration.

The diffusion plate 24 and the optical sheets 25 are positioned at the opening 211 of the casing 21 behind the light mixing plate 23. The optical sheets 25 contain one ore more diffusion sheet 251 and prism sheets 252. The number of diffusion and prism sheets 251 and 252, and their relative positions, could be adjusted based on the application requirement.

The light from the LEDs 22 is blocked by the light shielding dots 233 immediately in the front, and therefore a large portion of the light propagates along the inside of the light mixing plate 23. As such, the colored lights from the red-light LEDs 221, green-light LEDs 222, and blue-light LEDs 223 are mixed inside the light mixing plate 23 to produce white light. The lights are then further scattered and uniformed by the diffusion plate 24 and the diffusion sheets 251. The lights are also focused by the prism sheets 252 for brightness enhancement, and then are projected to the back of the LCD panel A.

As shown in FIG. 4, as the LEDs 22 are positioned outside of the light incidence plane 232, light from the LEDs 22 are incident into the light incidence plane 232 at an angle. Even though a portion of the light indeed propagates along the light mixing plate 23 and is thereby mixed, still a large portion of the non-mixed, red, green, and blue lights is directly refracted out of the light emission plane 231 if their incident angles to the light emission plane 231 are smaller than a threshold angle. This incomplete mixing phenomenon could be resolved by lengthening the distance between the light mixing plate 23 and the diffusion plate 24 so that these non-mixed lights get a second chance to mix with each other as they propagate toward the diffusion plate 24. This inevitably makes the backlight module 2 quite thick, which is not conforming to the market's requirement for slim LCDs.

To overcome the foregoing problem of LED-based direct-lit backlight modules, a technique illustrated in FIG. 5 has been disclosed. As shown, the backlight module 3 similarly contains a casing 31, a number of LEDs 32, a light mixing plate 33, a diffusion plate 34, and one or more optical sheets 35. The difference lies in that the LEDs 32 are side-emitting LEDs, as shown in FIG. 6. Each of the LEDs 32 has a reflection lens 321 in the shape of an inverted cone configured in the front, which reflects the light from the LED 32 and the light's incident angle into the light incidence plane 332 of the light mixing plate 33 is thereby increased. This technique is effective but, however, only to a limited extent. Still a large portion of the non-mixed lights from the LEDs 32 is refracted out of the light emission plane 331 and a certain distance between the light mixing plate 33 and the diffusion plate 34 still has to be maintained.

SUMMARY OF THE INVENTION

The primary purpose of the present invention is to provide a novel backlight module, which mainly contains a casing, a light mixing plate, a diffusion plate, a number of LEDs and optical sheets. The LEDs are positioned along the light incidence planes at the sides of the light mixing plate. The casing is positioned in front of the light mixing plate with the diffusion plate at the back opening of the light mixing plate. The optical sheets are placed in turn behind the diffusion plate. As such, the thickness of the backlight module is reduced significantly.

Another purpose of the present invention is to reduce the light mixing area of the light mixing plate by having a number of saw-tooth shaped entities arranged in parallel along the light incidence planes to provide early scattering as the light enters the light mixing plate through the light incidence planes.

Yet another purpose of the present invention is to provide further brightness enhancement to the light emitted out from the light emission plane of the light mixing plate by having a number of saw-tooth shaped entities arranged in parallel on the light emission plane to provide additional focusing.

Still another purpose of the present invention is to provide further control over the light power distribution of the light emitted out of the backlight module by having a number of saw-tooth shaped entities arranged in parallel on the light reflection plane of the light mixing plate, and the distance between adjacent saw-tooth shaped entities is increased as they are located closer to the LEDs.

An additional purpose of the present invention is to provide further brightness enhancement to the light emitted out of the backlight module by having a number of saw-tooth shaped entities arranged in parallel both on the light emission plane and the light reflection plane of the light mixing plate.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
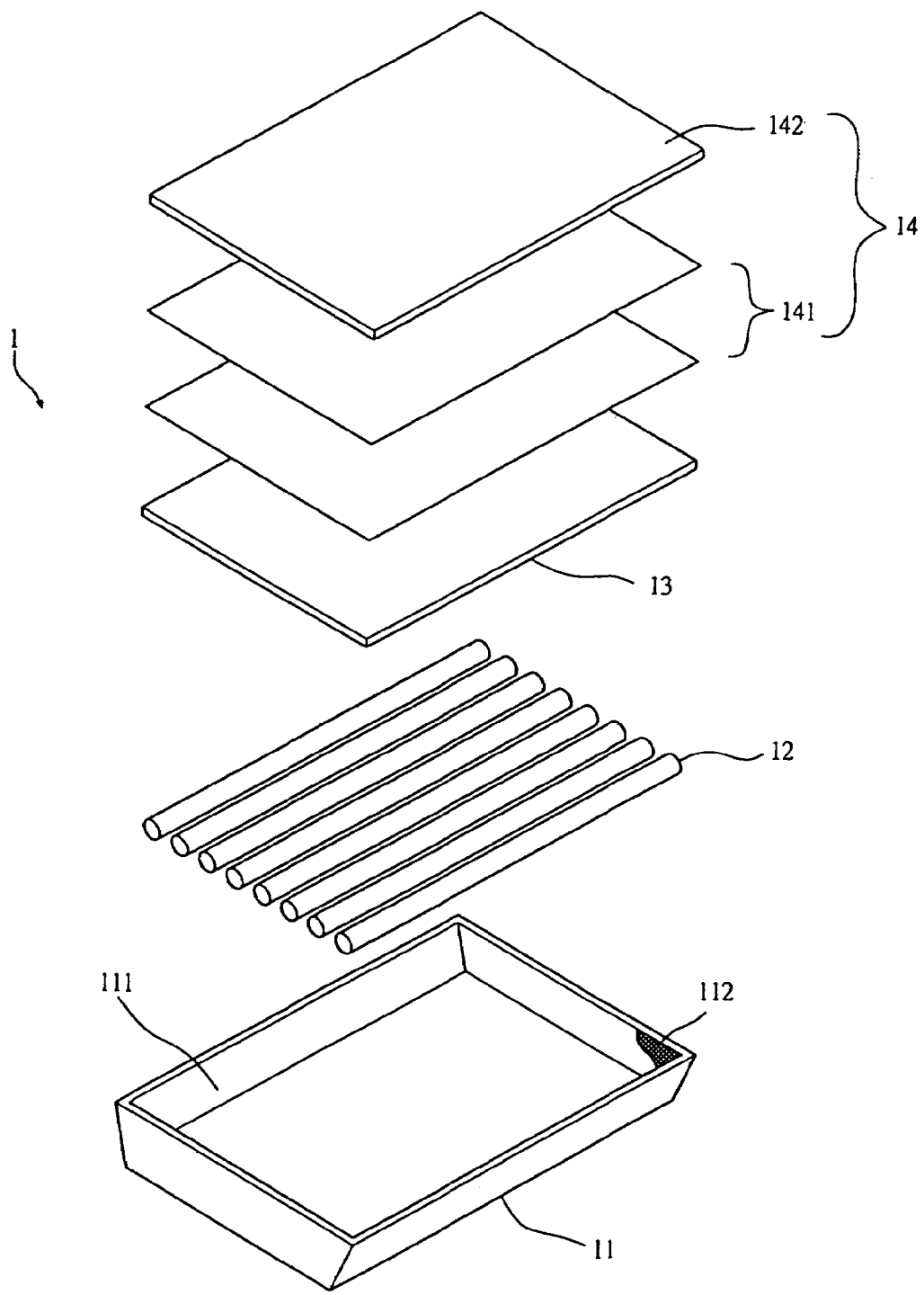
FIG. 1 is a perspective blown-up view showing the various components of a conventional direct-lit backlight module.
Figure 2:
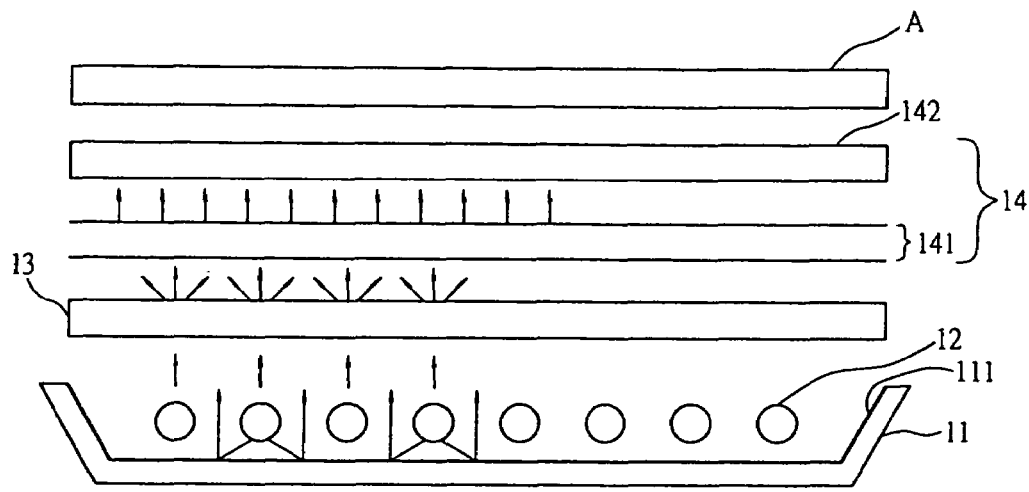
FIG. 2 is a schematic sectional view showing the conventional direct-lit backlight module of FIG. 1.
Figure 3:
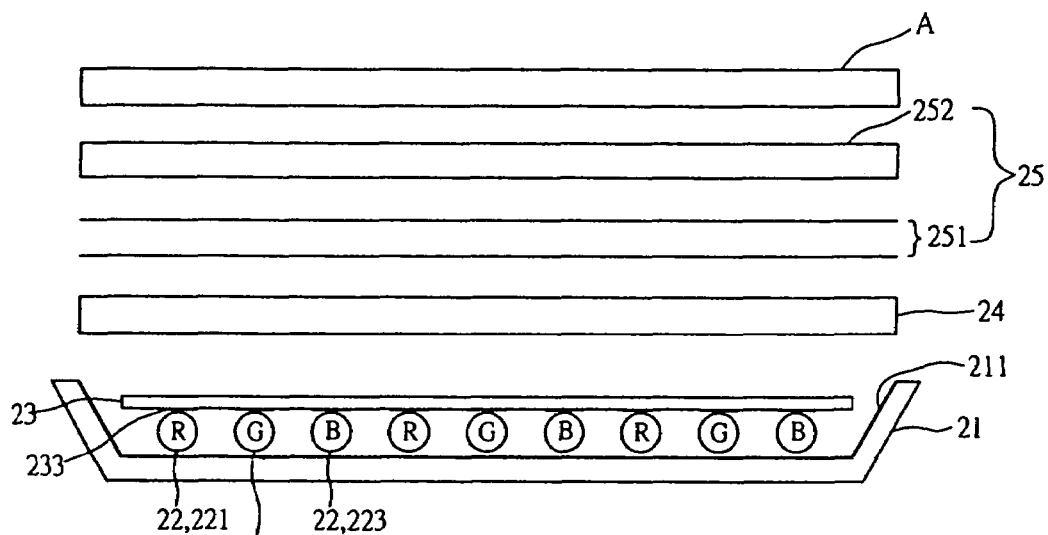
FIG. 3 is a schematic sectional view showing another conventional direct-lit backlight module.
Figure 4:
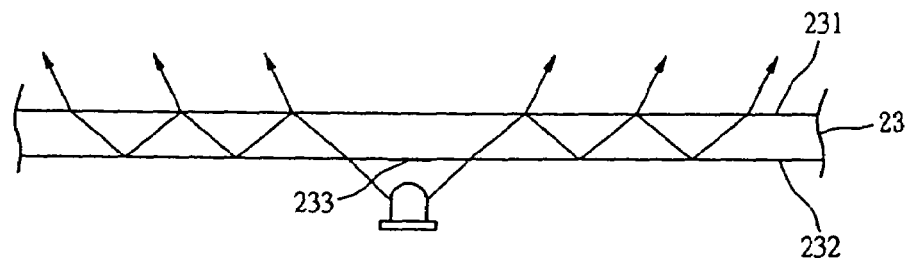
FIG. 4 is a schematic view showing the trajectories of light emitted from a LED of FIG. 3.
Figure 5:
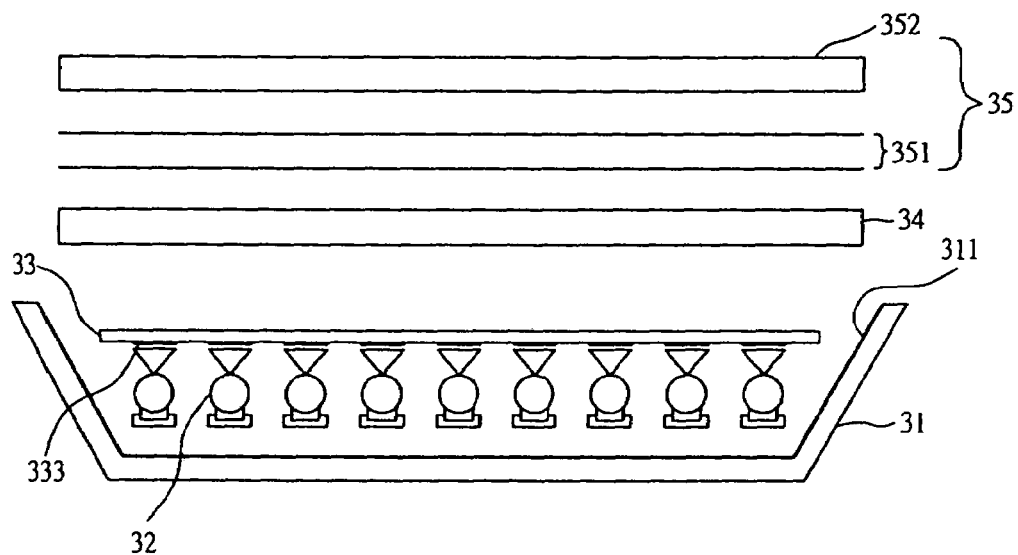
FIG. 5 is a schematic sectional view showing yet another conventional direct-lit backlight module.
Figure 6:
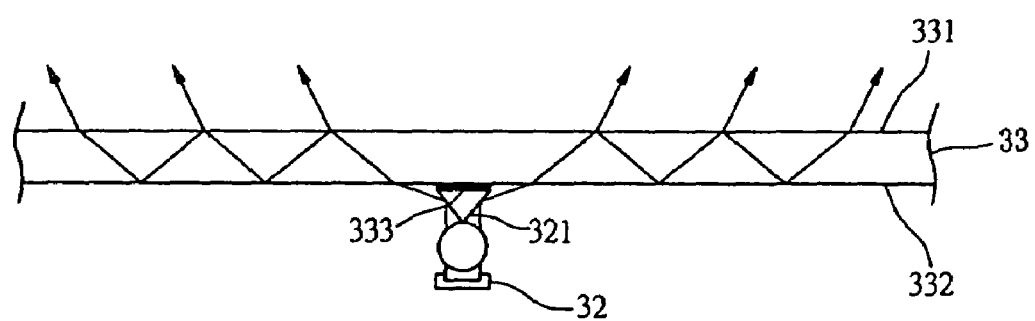
FIG. 6 is a schematic view showing the trajectories of light emitted from a LED of FIG. 5.
Figure 7:
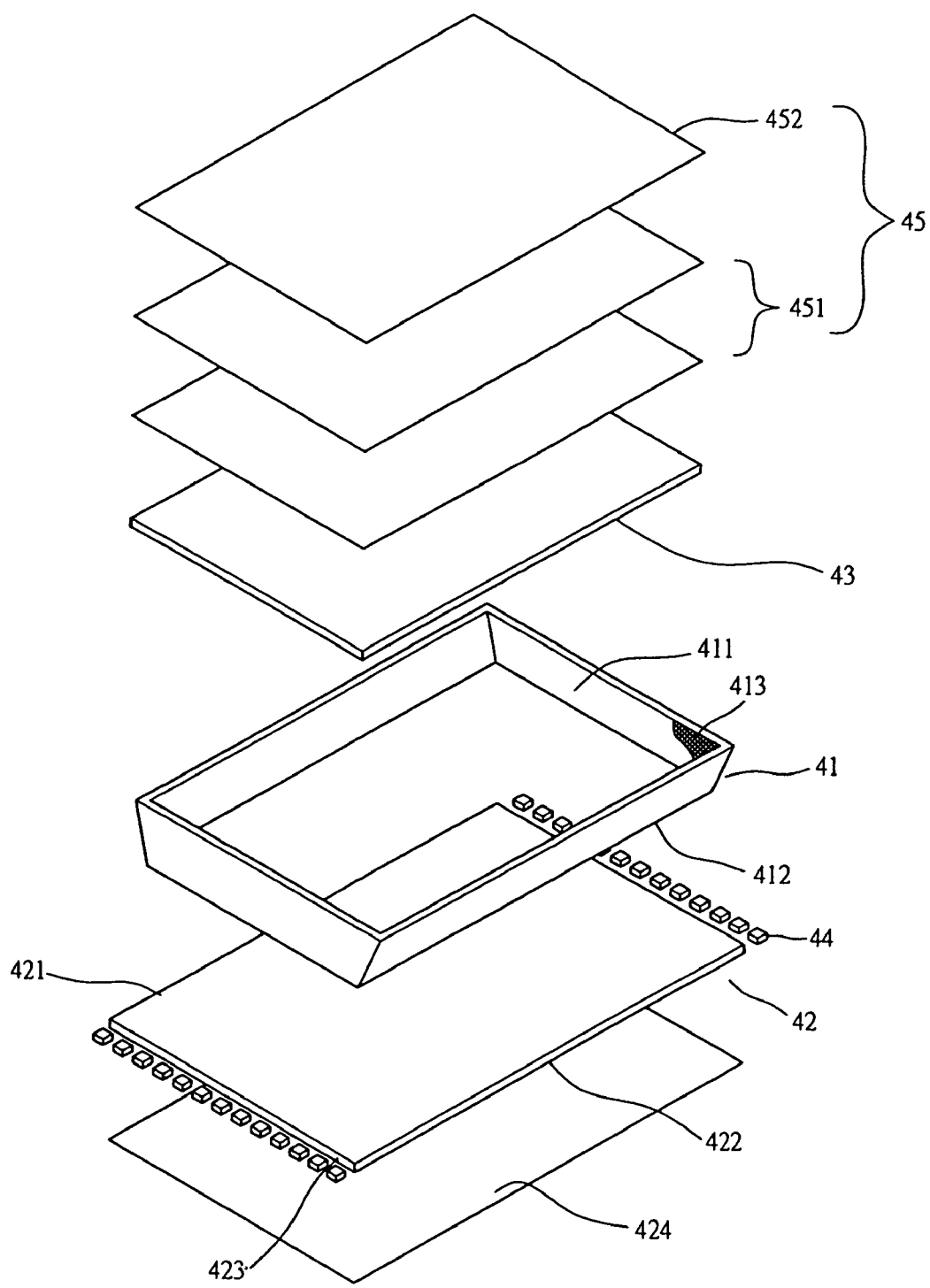
FIG. 7 is a perspective blown-up view showing the backlight module according to an embodiment of the present invention.

A backlight module 4 according to an embodiment of the present invention, as shown in FIG. 7, mainly contains a casing 41, a light mixing plate 42, a diffusion plate 43, a number of LEDs 44, and a number of optical sheets 44.

The casing 41 is a hollow frame having a back opening 411 gradually shrunk to a front opening 412. The inner surface of the casing 41 is reflective or is coated with a reflection film 413.

The light mixing plate 42 is made of a material having high transparency (such as PMMA). The light mixing plate 42 has a light emission plane 421, a light reflection plane 422 opposite to the light emission plane 421 and, at least a light incidence plane 423 at a side joining with both the light emission and reflection planes 421 and 422. Outside the light reflection plane 422, there is a reflection sheet 424.

The diffusion plate 43 is positioned at the opening 411 of the casing 41 and the optical sheets 45 are stacked the back of the diffusion sheet 43.

The LEDs 44 are positioned along the light incidence planes 423 of the light mixing plate 42. The LEDs 44 could be all white-light LEDs or could contain red-light (R), green-light (G), and blue-light (B) LEDs.

The optical sheets 45 contain one or more diffusion sheets 451 and prism sheets 452. The number of diffusion and prism sheets 451 and 452, and their relative positions, could be adjusted based on the application requirement.

Figure 8:
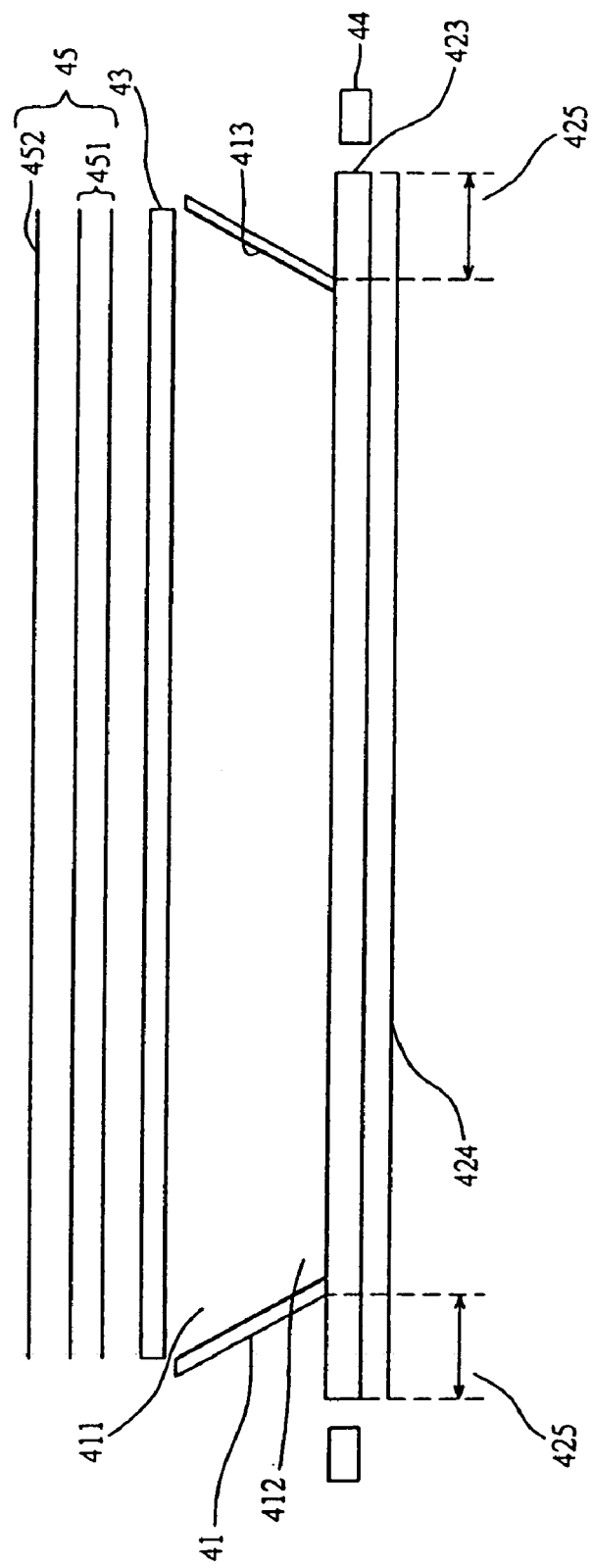
FIG. 8 is a schematic sectional view showing the backlight module of FIG. 7.

As shown in FIG. 8, to assemble the backlight module 4, the casing 41 is first positioned on the light emission plane 421 of the light mixing plate 42. Since the casing 41 shrinks from the larger back opening 411 to the smaller front opening 412, a region 425 of the light mixing plate 42 is not covered by the front opening 412 of the casing 41. The region 425 is referred to as the light mixing region. The LEDs 44 are then positioned along the light incidence planes 423 of the light mixing plate 42. Subsequently, the diffusion plate 43 is positioned at the back opening 411 of the casing 41, and the diffusion sheets 451 and the prism sheets 452 are placed behind the diffusion plate 43. At last, a cover (not shown) seals the backlight module 4 into an airtight unit and the assembly of the backlight module 4 is completed.

When the present embodiment is in operation, the red, green, and blue lights of the LEDs 44 are incident into the light mixing plate 42 via the light incidence planes 423 and mixed with each other within the light mixing region 425 into white light. A portion of the light is emitted directly out of the light mixing plate 42 via the light emission plane 421 while the other portion of the light penetrates through the light reflection plane 422 and gets reflected by the reflection sheet 424 back to light emission plane 421. The light is then further scattered and uniformed by the diffusion plate 43 and the diffusion sheets 451. Then the light is focused by the prism sheet 452 into collimated light beams for enhanced brightness. The light is then projected to the LCD panel (not shown).

Figure 9:
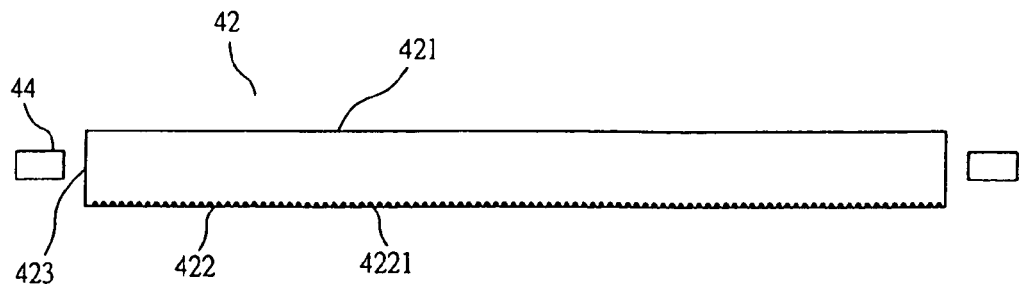
FIGS. 9–11 are schematic sectional views showing the light reflection plane of the light mixing plate according to some embodiments of the present invention respectively.
Figure 10:
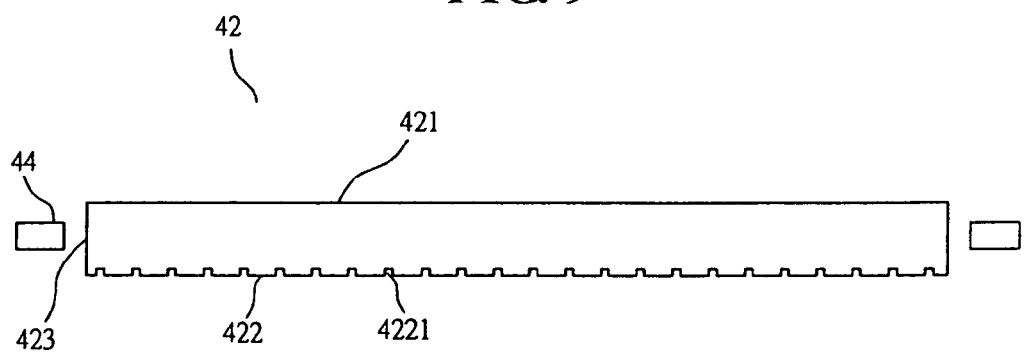
Figure 11:
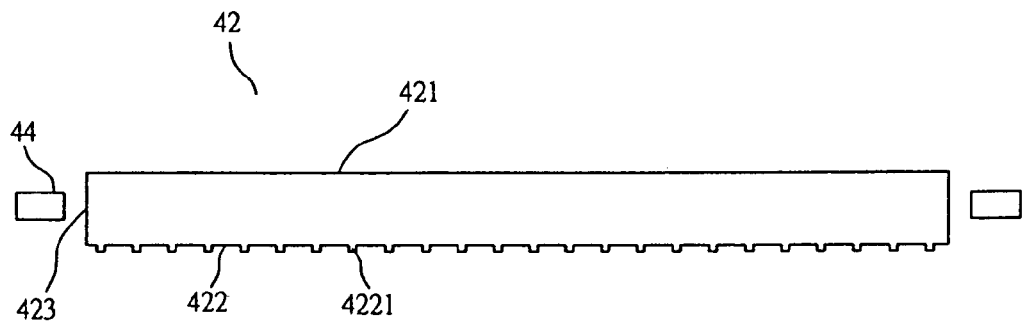

The light reflection plane 422 of the light mixing plate 42 could have a pattern of light guiding dots 4221 formed by, for example, ink printing as shown in FIG. 9. Or, the light guiding dots 4221 could be formed, when molding the light mixing plate 42, as pits into the light mixing plate 42 as shown in FIG. 10, or as grains on the outside of the light mixing plate 42 as shown in FIG. 11. In either way, the light shooting on the light reflection plane 422 is not only reflected but also scattered by the light guiding dots 4221 to further enhance the uniforming effect of the light mixing plate 42.

Figure 12:
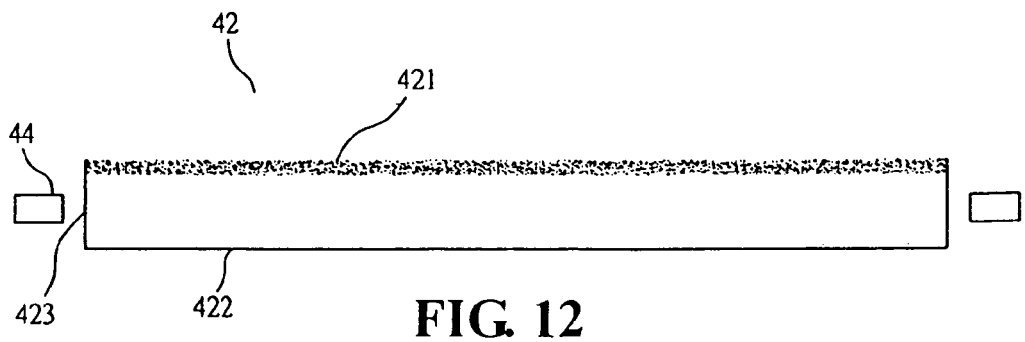
FIG. 12 is a schematic sectional view showing the light emission plane of the light mixing plate according to an embodiment of the present invention.

As shown in FIG. 12, the light emission plane 421 of the light mixing plate 42 could have its surface roughened to become a matt surface. As such, when the light is emitted from the light mixing plate 42 via the light emission plane 421, the light is further scattered and uniformed.

Figure 13:
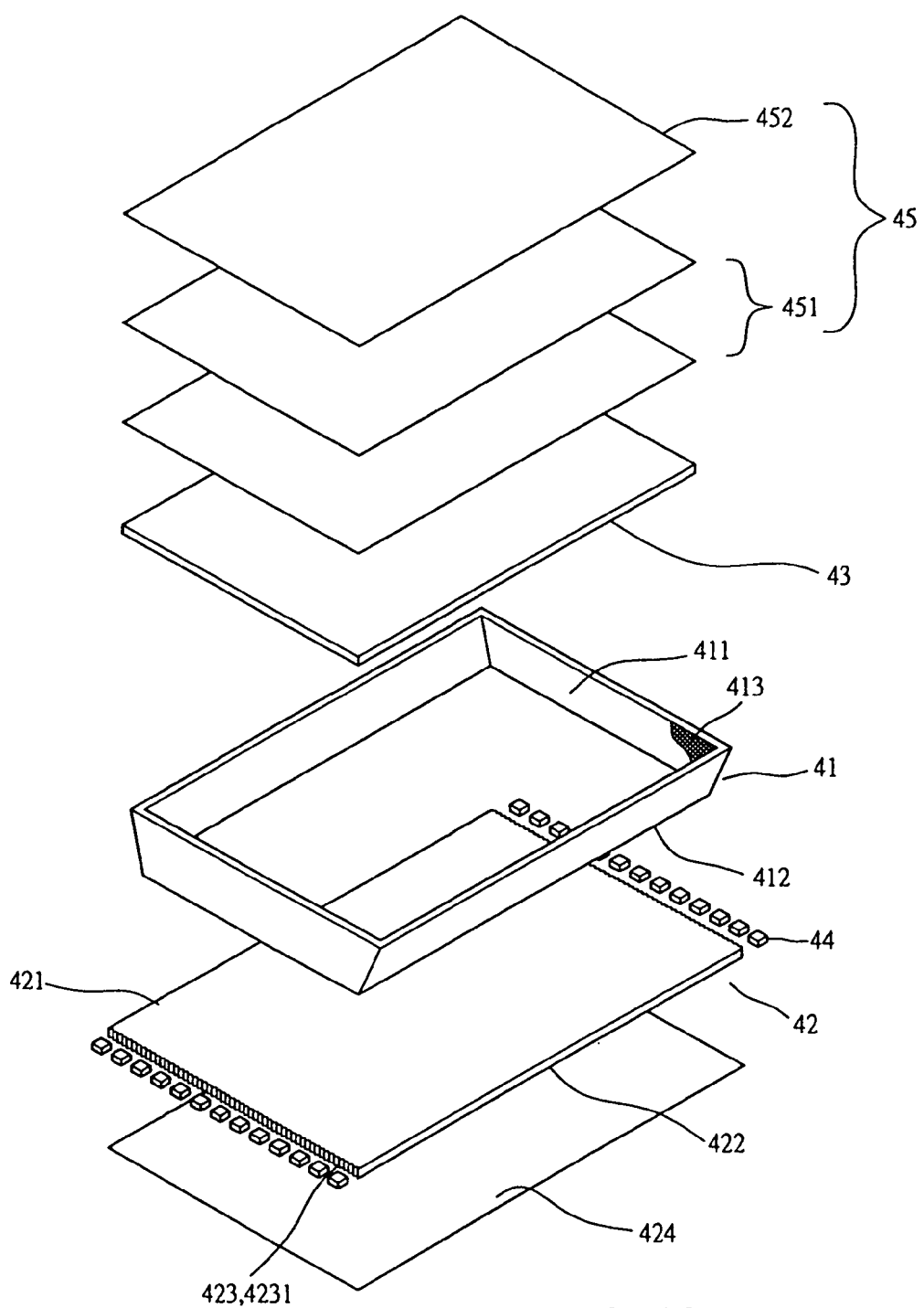
FIG. 13 is a perspective blown-up view showing the light incidence plane of the light mixing plate according to an embodiment of the present invention.

As shown in FIG. 13, the outer surface of the light incidence plane 423 of the light mixing plate 42 is configured to have a number of saw-tooth shaped entities 4231 arranged in parallel so that, when the light from the LEDs 44 is emitted to the light incidence plane 423, the light undergoes earlier scattering and uniforming by the saw-tooth shaped entities 4231. As such, the size of the light mixing region 425 could be reduced.

Figure 14:
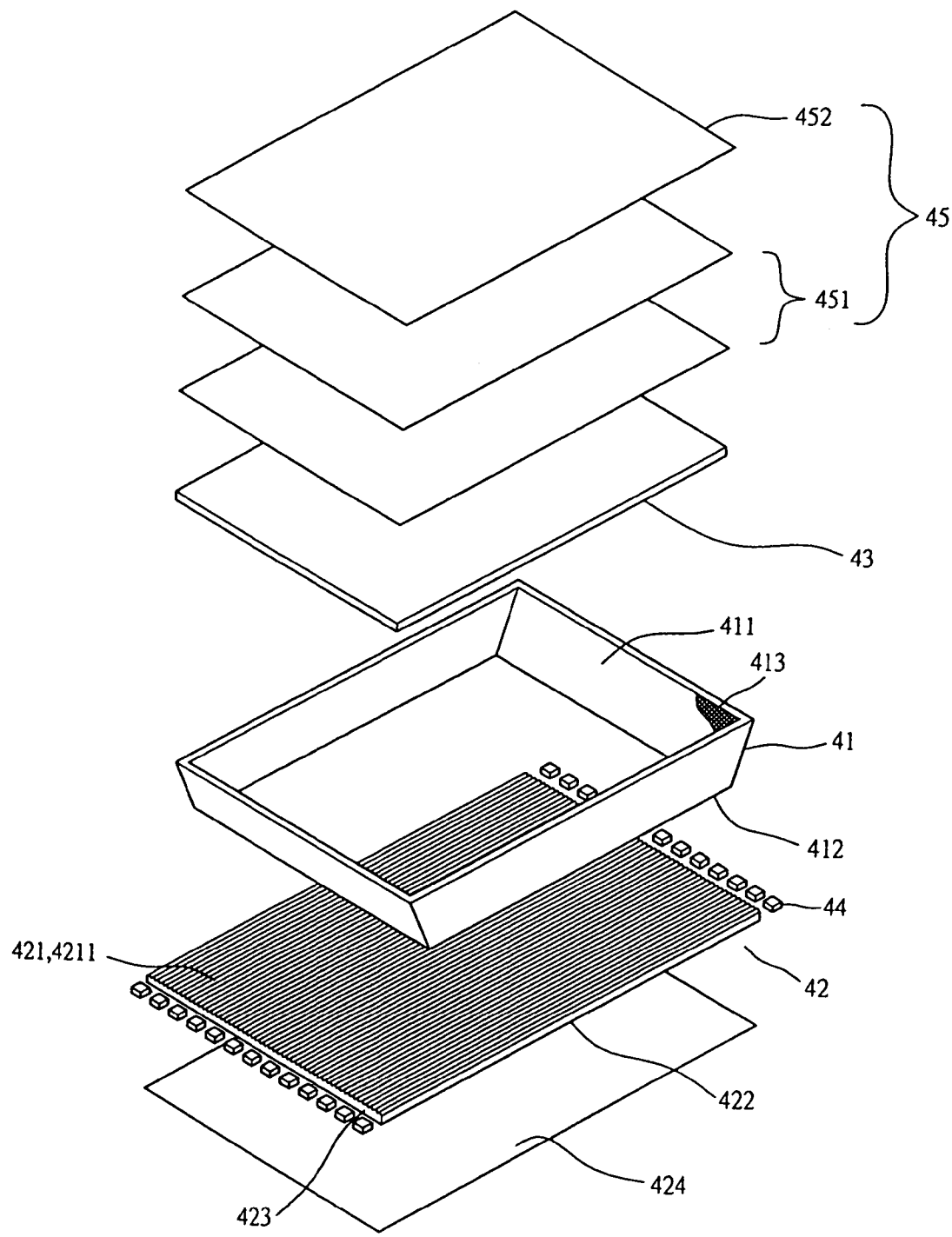
FIG. 14 is a perspective blown-up view showing the light emission plane of the light mixing plate according to another embodiment of the present invention.

As shown in FIG. 14, the outer surface of the light emission plane 421 of the light mixing plate 42 is configured to have a number of saw-tooth shaped entities 4211 arranged in parallel so that, when the light is emitted out of the light mixing plate 42 via the light emission plane 421, the saw-tooth shaped entities 4211 focus the light into collimated light beams for brightness enhancement.

Figure 15:
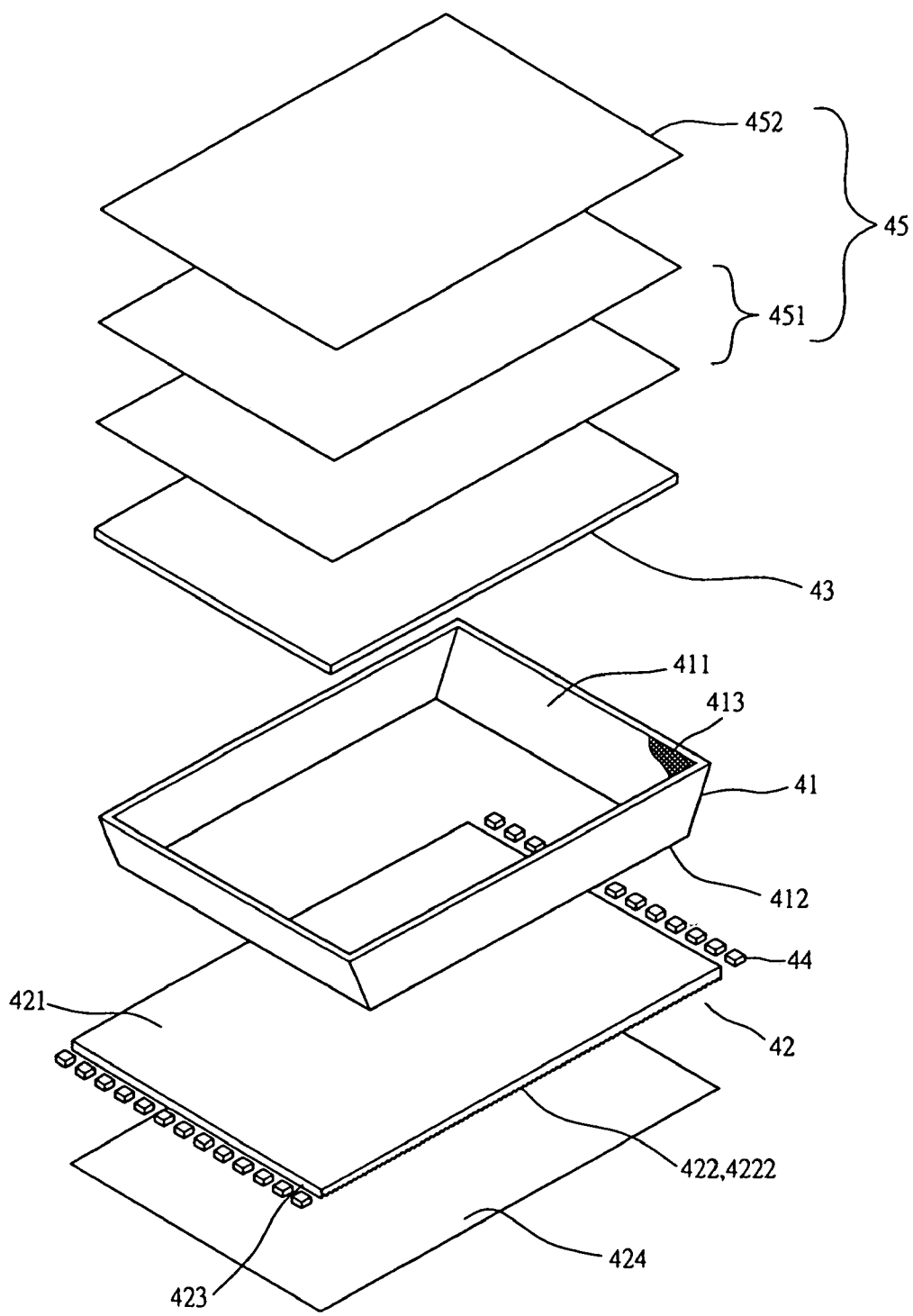
FIG. 15 is a perspective blown-up view showing the light reflection plane of the light mixing plate according to another embodiment of the present invention.
Figure 16:
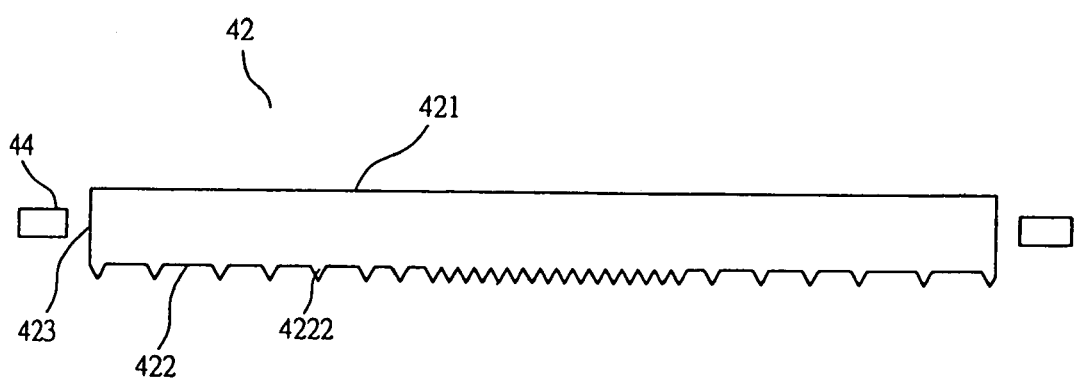
FIG. 16 is a schematic sectional view showing a variation of the light reflection plane of FIG. 15.

As shown in FIG. 15, the outer surface of the light reflection plane 422 of the light mixing plate 42 is configured to have a number of saw-tooth shaped entities 4222 arranged in parallel so that, when the light is emitted to the light reflection plane 422, the light is reflected and directed to the light emission plane 421 by the saw-tooth shaped entities 4222. In an alternative embodiment, as shown in FIG. 16, the distance between neighboring saw-tooth shaped entities 4222 is increased as they are located closer to the LEDs 44 so as to control of the distribution of the light power according to the light's intensity.

Figure 17:
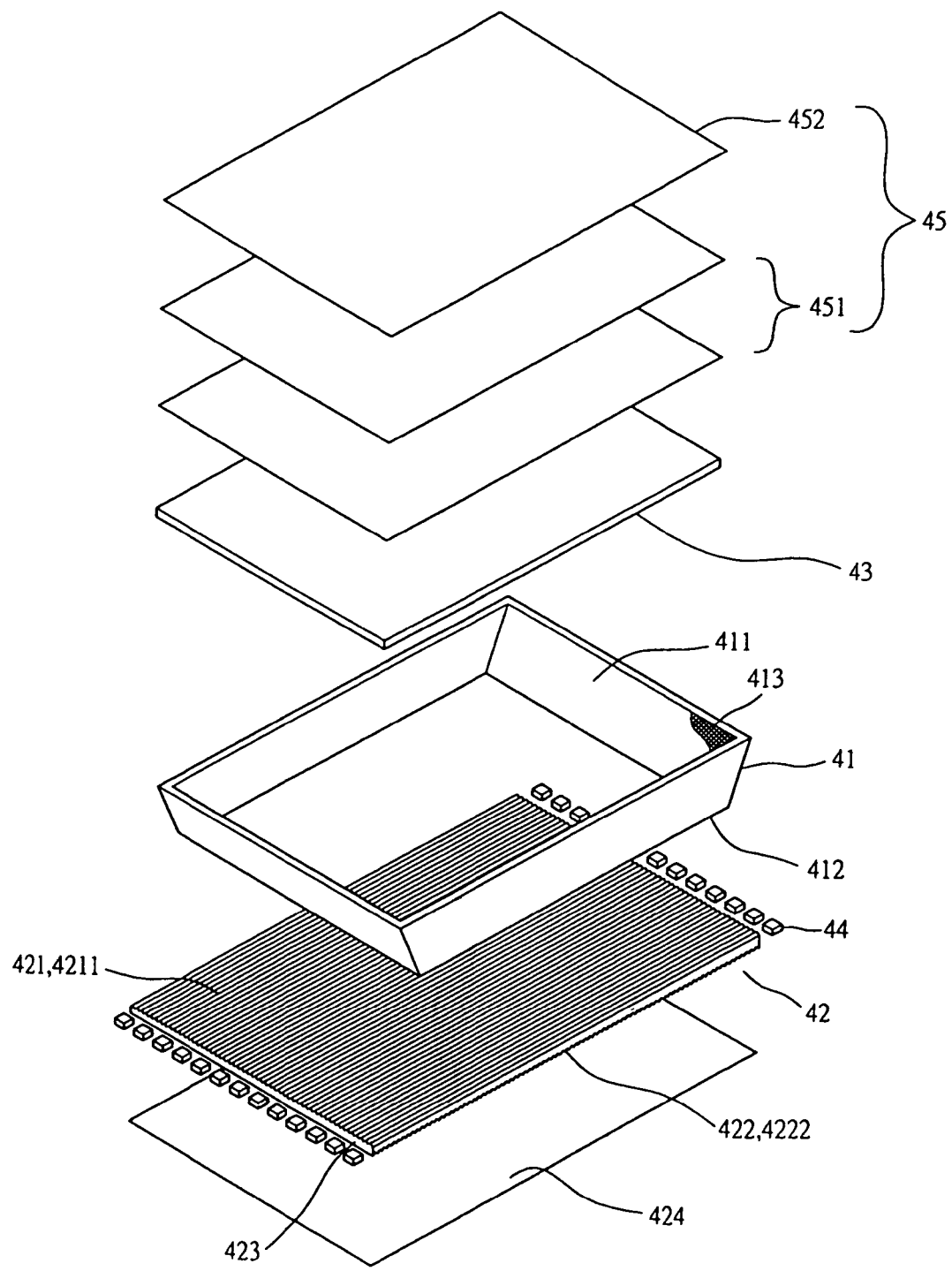
FIG. 17 is a perspective blown-up view showing the light mixing plate combining the embodiments of FIGS. 14 and 15.

As shown in FIG. 17, the light emission plane 421 and the light reflection plane 422 could both be configured to have saw-tooth shaped entities 4211, and 4222 respectively, and the orientations of the saw-tooth shaped entities 4211 and 4222 are orthogonal to each other. As such, the backlight module 4 is able to provide even better brightness enhancement.

The advantages of the present invention are as follows. By arranging the light mixing plate 42 in the back of the casing 41 and positioning the LEDs 44 along the light incident planes 423 at the sides, the thickness of the backlight model 4 could be reduced significantly. In addition, by having the saw-tooth shaped entities 4231 on the light incidence plane 423, the light mixing region 425 could be reduced, making the backlight module 4 even smaller. Further, by having the saw-tooth shaped entities 4211 and 4222 on the light emission plane 421 and the light reflection plane 422, the light delivered by the backlight module 4 has superior brightness than those provided by the prior arts. As such, the number of LEDs 44 could also be reduced, leading to a lower product cost.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A backlight module, comprising:
    a light mixing plate having a light emission plane, a light reflection plane opposite to said light emission plane, and at least a light incidence plane at a side of said light mixing plate joining with said light emission plane and said light reflection plane;
    a plurality of LEDs positioned along said light incidence plane outside said light mixing plate;
    a casing being a hollow frame with a back opening gradually shrunk to a front opening, said casing being positioned with said front opening attached to said light emission plane of said light mixing plate;
    a diffusion plate positioned at said back opening of said light mixing plate; and
    a plurality of optical sheets positioned behind said diffusion plate.

2. The backlight module according to claim 1, wherein said plurality of LEDs are white-light LEDs.

3. The backlight module according to claim 1, wherein said plurality of LEDs are red-light, green-light, and blue-light LEDs.

4. The backlight module according to claim 1, wherein said light reflection plane of said light mixing plate has a plurality of light guiding dots.

5. The backlight module according to claim 4, wherein said light guiding dots are formed by ink printing.

6. The backlight module according to claim 4, wherein said light guiding dots are formed by molding as pits into said light mixing plate.

7. The backlight module according to claim 4, wherein said light guiding dots are formed by molding as grains on the outside of said light mixing plate.

8. The backlight module according to claim 1, wherein said light emission plane of said light mixing plate is a roughened matt surface.

9. The backlight module according to claim 1, wherein the outer surface of said light incidence plane of said light mixing plate has a plurality of saw-tooth shaped entities arranged in parallel.

10. The backlight module according to claim 1, wherein the outer surface of said light emission plane of said light mixing plate has a plurality of saw-tooth shaped entities arranged in parallel.

11. The backlight module according to claim 1, wherein the outer surface of said light reflection plane of said light mixing plate has a plurality of saw-tooth shaped entities arranged in parallel.

12. The backlight module according to claim 11, wherein the distance between neighboring saw-tooth shaped entities is increased as said saw-tooth shaped entities are located closer to said LEDs.

13. The backlight module according to claim 1, wherein the outer surfaces of said light reflection plane and said light emission plane of said light mixing plate both have a plurality of saw-tooth shaped entities arranged in parallel.

14. The backlight module according to claim 13, wherein said saw-tooth shaped entities of said light emission plane and said saw-tooth shaped entities of said light reflection plane are arranged in orthogonal orientations.

* * * * *